Sept. 3, 1929.  A. M. HUDSON  1,726,956
BUMPER
Original Filed Sept. 5, 1923   3 Sheets-Sheet 1
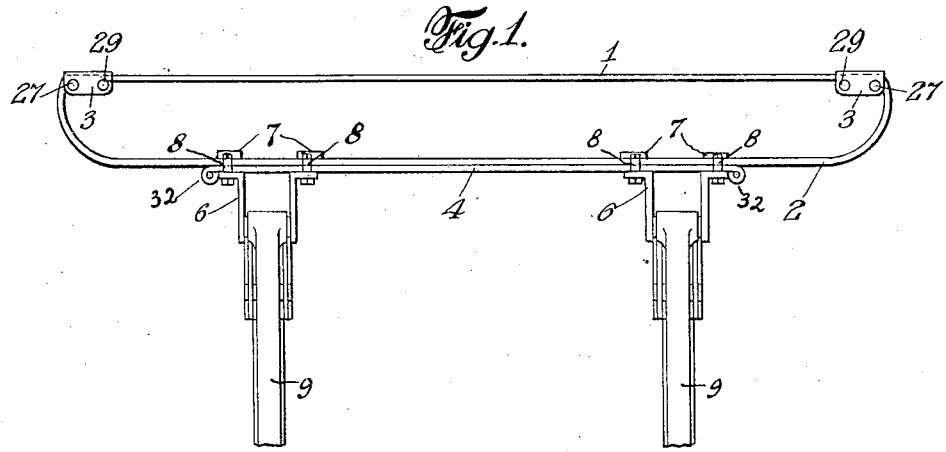
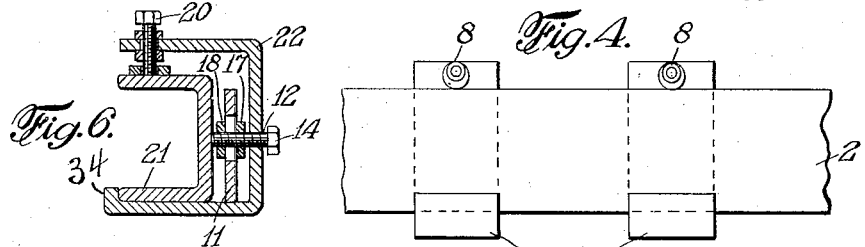
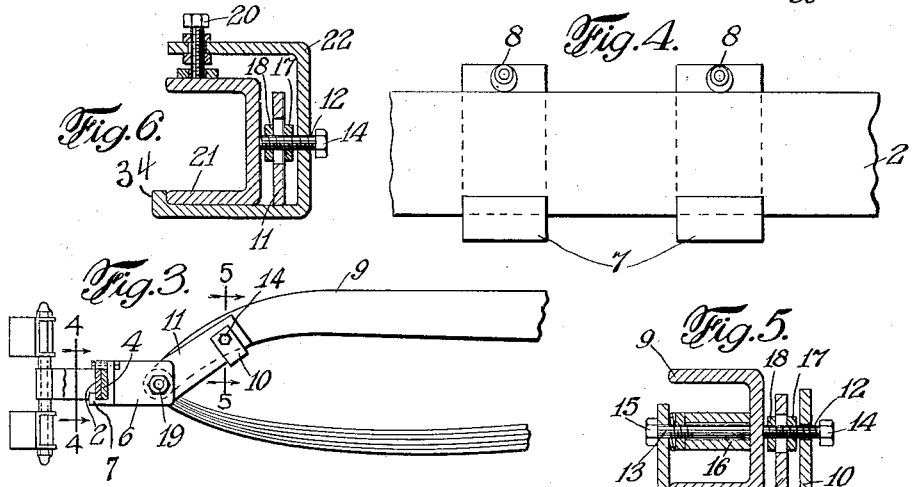
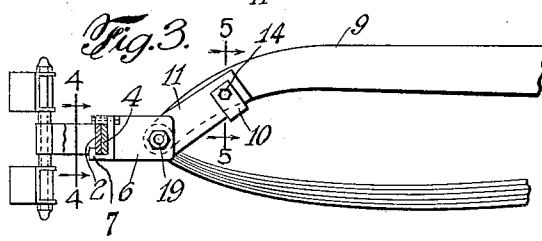
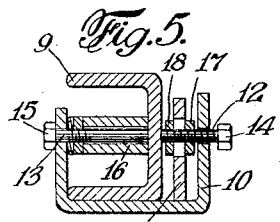

Sept. 3, 1929.  A. M. HUDSON  1,726,956
BUMPER
Original Filed Sept. 5, 1923  3 Sheets-Sheet 2
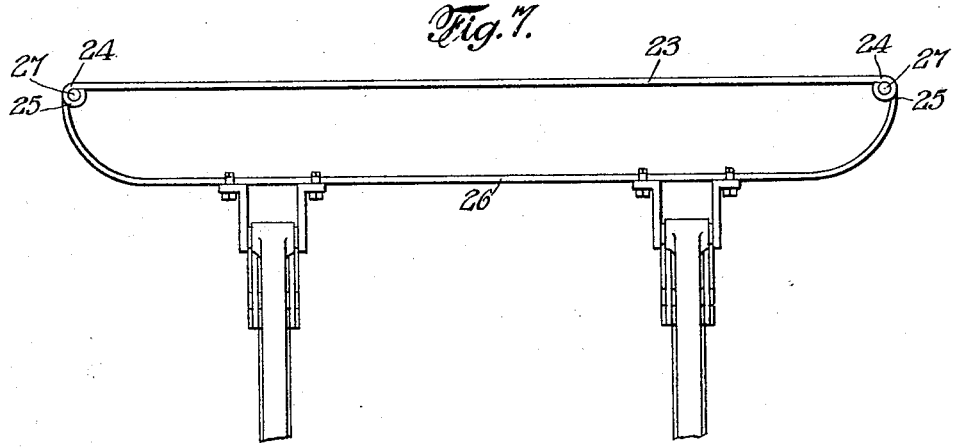
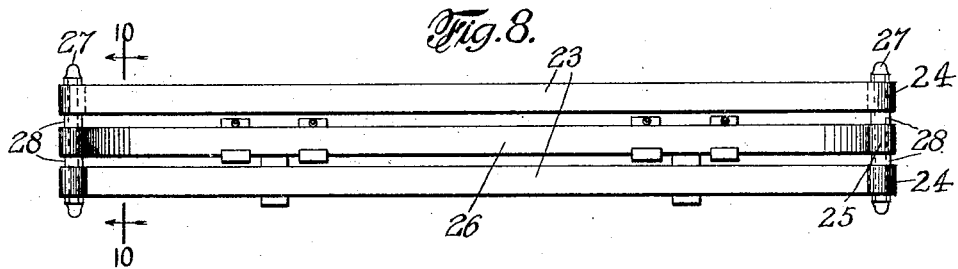
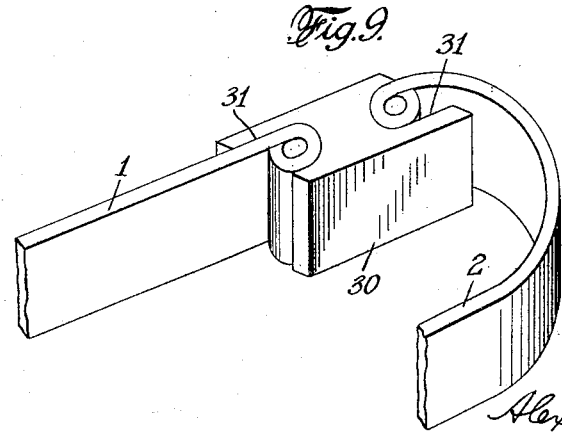
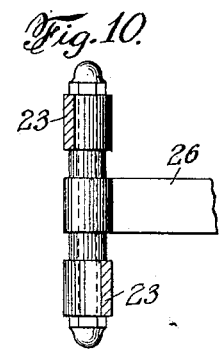
Inventor
Alexander M. Hudson
By his Attorneys
Kenyon & Kenyon Sept. 3, 1929.    A. M. HUDSON    1,726,956
BUMPER Original Filed Sept. 5, 1923    3 Sheets-Sheet 3

INVENTOR
Alexander M. Hudson
BY
Kenyon & Kenyon
ATTORNEYS

Patented Sept. 3, 1929.

1,726,956

UNITED STATES PATENT OFFICE.

ALEXANDER M. HUDSON, OF NEW YORK, N. Y.

BUMPER.

Application filed September 5, 1923, Serial No. 660,975. Renewed December 19, 1928.

My invention relates to bumpers or fenders which are more especially adapted to be applied to automobiles, and are constructed preferably of spring metal.

The object of the invention is to provide a simple and effective spring fender or bumper arranged to extend transversely across the front of a vehicle, and to a point on either side slightly beyond the line of the wheels, to act as a protector for the car generally, and its parts, and as a means of preventing people from being struck by the wheels, or, when struck by the fender or bumper, from falling against the wheels.

Another object of the invention is the production of a fender or bumper which comprises parts so constructed and combined that in operation they will take up or absorb the shock of a collision to a very material degree, and then resume their original position practically undistorted.

Another object of the invention is a bumper which, because of its construction, will have a tendency to turn the force of an impact in a forward direction. Its outward forwardly curved terminals are thus prevented from being forced backward against the shoes, and the consequent danger of cutting or destroying the latter avoided.

Another object of the invention is to devise a bumper with connections which may be attached to any type of chassis without changing the latter in any respect.

Figure 11:
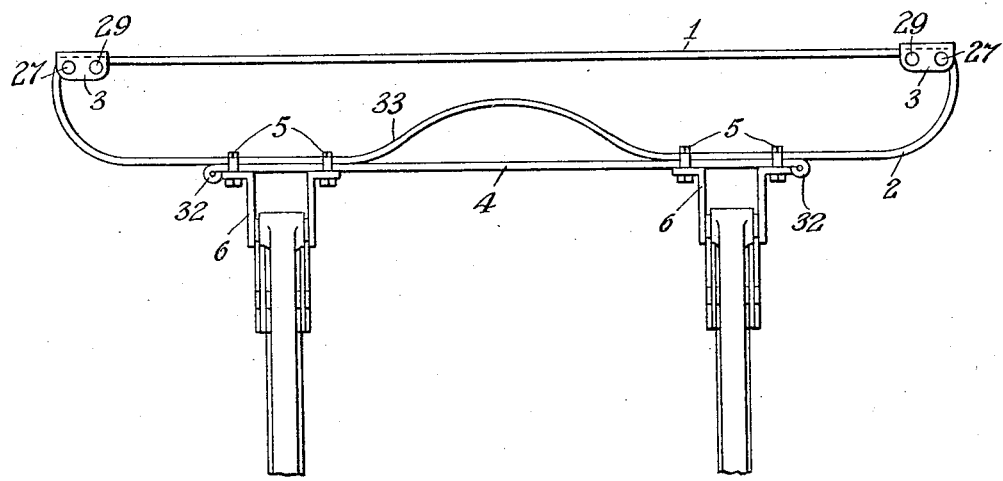
Figure 12:
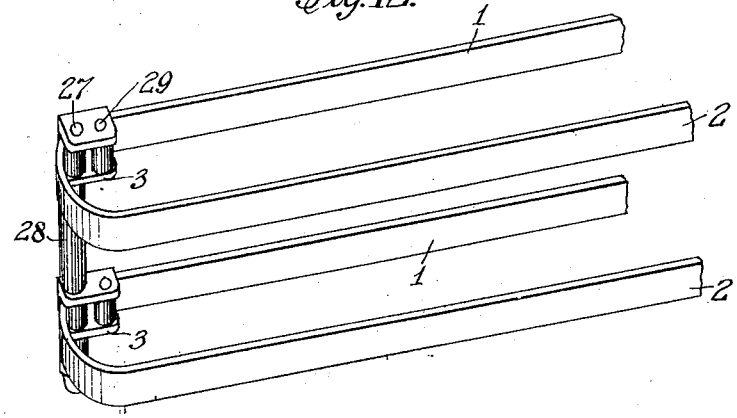

In the drawings which form a part hereof, Figure 1 is a top plan view of my invention attached to the horns or frame of an automobile; Fig. 2 is a front view; Fig. 3 is a side view showing means for attachment to the horns of the chassis frame; Fig. 4 is a section on the line 4—4 of Fig. 3; Fig. 5 is a section on the line 5—5 of Fig. 3 illustrating the fastening means; Fig. 6 shows a modified form of fastening means; Figs. 7 and 8 show plan and front views, respectively, of a modification of my invention; Fig. 9 shows another modification of my invention, and Fig. 10 a section on line 10—10 of Fig. 8. Fig. 11 is a top view of a modification and Fig. 12 is a fragmental perspective view showing pairs of front and rear bars in combination.

Referring to Figs. 1 to 6 of the drawings, the numeral 1 designates flat spring bars which form the front or impact member of the fender. This is attached to a rear flexible steel bar 2, the ends of which are forwardly turned, by suitable connecting means. As shown, I prefer to use as my connecting means shackles 3, also preferably of steel, which are connected to the bars constituting the impact member by bolts 29, and to the curved terminals of the rear bar 2 by means of headed bolts 27. Where a single front and rear bar are used as a fender, the shackles may be made to unite them by any suitable means such, for instance, as bolts 29.

Back of the rear bar and extending the greater part of its length, is a reenforcing bar 4 with enlarged ends 32. This is not a necessary part of my device, but on fenders intended for heavy trucks or cars it will be found advantageous. It is held in place by the angular clamping members of plates 6, which latter, while holding the rear bar and the reenforcing bar together, also serve to provide means of attachment to the chassis. In the event of a sidewise collision which might force the bar 2 to one side or the other against the tension of plates 6, the bar 4 would remain practically stationary because its enlarged ends 32 would not permit it to be moved past the plates 6.

The angular clamping members of plates 6 are better illustrated in Fig. 2. As shown in this figure they have upturned lips or flanges 7, 7. These engage with the under side of the rear fender bar, and are held in place by any suitable means as by eccentric washers (that is washers having the opening thereto off center) and screws 8, 8 contacting with the top of said bar. Where, as shown in Fig. 2, the impact member of the bumper is made up of a pair of flat spring steel bars, the clamping members are attached to bar 2 which is provided with forwardly-turned ends.

My improved fender may be attached to the chassis in any way desired. In Fig. 3 it is shown fastened to a frame 9 by means illustrated in detail in Fig. 5. These consist of channel iron 10, plates 11, bolts 12 and 13 with their respective heads 14 and 15, spacer 16, and nuts 17 and 18, in connection with the bolt and nut 19 on the end of the chassis frame.

In Fig. 6 another form of fastening means is shown in section. The horn of the chassis is represented by 21. 11 indicates side plates and 22 is a channel iron which is upturned as at 34 to form a shoulder against which the horn of the chassis frame abuts. These members are held in side or lateral connection with the chassis by means of the bolt 12 and nuts 17 and 18, and, in addition, the channel iron is held in contact with the top of the horn by means of the bolts and nuts indicated by the numeral 20.

The modification of my invention shown in Figs. 7 and 8 differs from that already described merely in respect to the absence of the shackles 3. In this modification the shackles are dispensed with, and the terminals of the front bars 23 are formed into eyes 24 which register with similar eyes 25 on the forwardly curved ends of the rear bar 26. Through these eyes a headed bolt 27 is fastened. Where a combination fender is used, that is, one in which two or more pairs of front and rear bars are employed, spacers 28 are used to keep the respective pairs apart, as shown in Figs. 2, 8 and 12.

A possible variation in the form of the rear bar 2 is illustrated in Fig. 11. For some forms of heavy cars or trucks it will be found advisable to bend or curve the rear bar 2 intermediate its forwardly turned ends in the way illustrated at 33. The advantage of this is clear. In the event of a collision which forces the front bar back until it comes in contact with the curved portion 33, the additional resistance offered by this latter portion will materially lessen, if not overcome, the shock resulting therefrom.

The shackles 3 may be made in link form or of metal plates, or of any construction suitable for the purpose.

The modification of my invention illustrated in Fig. 9 is in connection with the type of fender shown in Figs. 1 and 2. It includes a concussion-absorbing block 30 of suitable material, preferably of rubber, which is cut away at points 31 so as to enable it to be positioned between and held in plate by the fastening means 27 and 29, and within the shackles 3 as shown in dotted lines in Fig. 2. This block is of such size that when in position its tendency is to exert a pressure in the direction of pushing said fastening means apart. The object of the block is to increase the tension between bars 1 and 2, aid in absorbing shocks, and at the same time prevent any possibility of rattling on the part of the shackles and fender bars in the operation of the car.

In Fig. 10 is shown in section the preferred arrangement of my fender bars. As there indicated, the upper one of the front bars 23 is mounted so as to be forward, or slightly in advance, of the lower bar 23, which latter is in advance of the middle bar, the three being in separate planes. It will be obvious, therefore, that on impact of the fender with any object, the upper bar will be the first to receive the shock. Should the impact be strong enough to overcome its resistance, it will be aided by the lower bar which is next in the line of impact, the two in turn, with their connected members, being reenforced by the centre bar should their combined resistance be insufficient to take up the force of the collision. If desired, the arrangement of the bars may be reversed, that is, the lower bar being the furthest advanced.

In Fig. 12 is shown a fender comprising two pairs of front and rear bars connected together by the shackles 3 and bolt 27 and held apart by the spacer 28.

It will be seen from the foregoing that I have devised a bumper or fender which is different in important respects from anything heretofore known. All types of fender that are now made are constructed with ends which turn backward. My improved fender is made with a substantially straight front bar connected to a second having ends which turn forward. The shackles which form a part of the combination of some of my claims herein, are original with me, and were disclosed for the first time in my Patent No. 1,393,020.

Owing to the peculiar construction and combination of the parts of my fender, its operation is materially different from that of others.

In the event of a collision, the front bar receives the first impact, and it may be sufficient to take up the incidental shock, depending of course upon the violence of the collision. Should it, however, be forced back a distance greater than the distance between the bolts connecting the shackles, it brings into play the shackles, which in turn are supplemented by the rear bar of the fender, the whole operating and uniting to absorb the violence of the shock, to the protection of the car and its occupants. Where the rear bar is constructed with a curved portion intermediate its forwardly turned ends, this provides additional protection and added means for absorbing the force of the shock.

Where a plurality of pairs of front and rear spring steel bars, combined in my improved way, are employed as a fender, the operation may differ under varying circumstances. Where, for instance, only one of the front bars, either a lower or an upper one, contacts with a car or an obstacle, which is not unusual, no other part of the fender may be affected. That is, the front bar, its rear bar, and the means connecting it to the forwardly curved terminals of the rear bar, may be sufficient to take up or absorb the incidental shock, and afterwards resume their respective positions undamaged. In other cases of greater need of course all parts of the fender will be brought into play. The protective force, therefore, which my fender brings into action is cumulative, increasing in accordance with the demands made upon it until all its force is employed.

One of the ways in which I prefer to construct my fender is to have its front bar and its associated rear bar connected under tension. This is done by having the front bar on a plane with the forwardly curved terminals of the rear bar, the connecting means or shackles between them being of such a length that it will be necessary to use a little force in causing the said curved terminals to bend in sufficiently to fasten the shackles in place between the two bars. In this way the bars are held taut, the tension will take up the wear of the plates of the shackles, and, in connection with members 30, the rattling of the parts is obviated.

I have described the front fender bar as substantially straight, but it may of course be made curved if desired. I have also shown the shackles and the curved terminals of the rear bars connected together by a single bolt, and the front bars connected to the shackles by individual bolts or studs. It would of course be possible to unite the ends of the front bars and shackles together by a suitably constructed bolt having a center or intermediate spacer in view of the fastening bar. It will be understood also that various other changes may be made in my improved bumper or fender without departing from the spirit of the invention, or the scope of the claims appended hereto.

What I claim as new, and desire to secure by Letters Patent, is:

1. A spring bumper comprising a front bar and a rear bar, the ends of the rear bar being forwardly directed, and shackles pivotally connecting the ends of the two bars, and means for attaching the bumper to a car.

2. A spring bumper comprising a rear bar having forwardly extending terminals, and a front bar of lesser length than said rear bar, the terminals of both bars being united by pivotally connected shackles, and means for attaching the bumper to a car.

3. A spring bumper comprising a rear bar having forwardly extending terminals, and a front bar, the two being disposed in the same horizontal plane and their terminals being pivotally connected by shackles, and means for attaching the bumper to a car.

4. A spring pumper comprising a front bar and a rear bar, the ends of the rear bar being forwardly directed, and shackles pivotally connecting the ends of the two bars, a reenforcing member connected to said rear bar, and means for attaching the bumper to a car.

5. A spring bumper comprising a rear bar having forwardly extending terminals, and a front bar of lesser length than said rear bar, the terminals of both bars being united by pivotally connected shackles, a reenforcing bar connected to said rear bar, and means for attaching the bumper to a car.

6. A spring bumper comprising a plurality of front bars and a plurality of rear bars in parallel relation to each other, the ends of the rear bars being forwardly directed, shackles pivotally connecting the ends of the rear bars to the ends of the front bars, and means for attaching the bumper to a car.

7. A spring bumper comprising a plurality of front bars and a plurality of rear bars in parallel relation to each other, the ends of the rear bars being forwardly directed, shackles pivotally connecting the ends of the rear bars to the ends of the front bars, the ends of the rear bars being connected together, and means for attaching the bumper to a car.

8. In a spring bumper, the combination with bumper supports, of a front bar, a rear bar, shackles pivotally connecting the outer ends of the front and rear bars and spacing the said ends apart, the outer ends of the rear bar being curved forward and having a portion intermediate said ends curved in the same direction.

9. A spring bumper comprising a front bar and a rear bar, the extremities of the rear bar being forwardly directed and pivotally connected to the extremities of the front bar, and means for attaching the bumper to a car.

10. A spring bumper comprising a plurality of front bars and a plurality of rear bars in parallel relation to each other, the extremities of the rear bars being forwardly directed and pivotally connected to the extremities of the front bars, and means for attaching the bumper to a car.

11. A spring bumper comprising a plurality of front bars and a plurality of rear bars in parallel relation to each other, the extremities of the rear bars being forwardly directed, means for pivotally connecting the extremities of all the bars together, and means for attaching the bumper to a car.

12. A spring bumper comprising a front bar and a rear bar, the ends of the rear bar being forwardly directed, shackles connecting the ends of the bars under tension, and means for connecting the bumper to a car.

13. A spring bumper comprising a rear bar having forwardly extending terminals, and a front bar of lesser length than said rear bar, the terminals of both bars being connected under tension by shackles, and means for attaching the bumper to a car.

14. A spring bumper comprising a plurality of front bars and a plurality of rear bars in parallel relation to each other, the ends of the rear bars being forwardly directed, shackles connecting the ends of the rear bars to the ends of the front bars under tension, and means for attaching the bumper to a car.

15. In a spring bumper, the combination with bumper supports, of a front bar, a rear bar, shackles connecting the outer ends of the front and rear bars under tension and spacing the said ends apart, the outer ends of the rear bar being curved forwardly and having a portion intermediate said ends curved in the same direction.

16. A spring bumper comprising a front bar and a rear bar, the extremities of the rear bar being forwardly directed and pivotally connected under tension to the extremities of the front bar, and means for attaching the bumper to a car.

17. In a spring bumper, a support for the same comprising in combination a plate attached to the bumper, the frame of an automobile, a channel member, a plate held in place by said channel member and said first mentioned plate, and means for attaching the support to the frame.

18. In a spring bumper, a support therefor including a plate attached to said bumper, and means for attaching the same to the frame of an automobile comprising a channel member, a plate extending from said channel member to said first mentioned plate, and adjustable means for connecting the said channel member and plate to the said frame and the first mentioned plate.

19. The spring bumper comprising a front bar and a rear bar, the ends of the rear bar being forwardly curved, shackles connecting the ends of the bars, the supporting means for attachment to a car including a plate for connection to the frame of a car, a channel member, a second plate held detachably in place between said channel member and said first named plate, and means for attaching the support to the frame.

20. A spring bumper comprising a front bar and a rear bar, the ends of the rear bar being forwardly directed, concussion-absorbing means between the ends of said bars, and shackles pivotally connecting the ends of the two bars.

21. A spring bumper comprising a rear bar having forwardly extending terminals, and a front bar of lesser length than said rear bar, a concussion-absorbing block positioned between the terminals of both bars, said bars being united by pivotally connected shackles.

22. A spring bumper comprising a rear bar having forwardly extended terminals, and a front bar, the two being disposed in the same horizontal plane and their terminals being pivotally connected by shackles, and a concussion-absorbing means located within said shackles.

23. A bumper comprising a plurality of front bars and a plurality of rear bars in parallel relation to each other, the ends of the rear bars being forwardly directed, shackles pivotally connecting the ends of the rear bars to the ends of the front bars, and concussion-absorbing means positioned between the ends of said bars.

24. A bumper comprising a plurality of front bars and a plurality of rear bars in parallel relation to each other, the ends of the rear bars being forwardly directed, shackles pivotally connecting the ends of the rear bars to the ends of the front bars, and concussion-absorbing means positioned between the ends of the said bars, and enclosed by said shackles.

25. A bumper comprising a plurality of front bars and a plurality of rear bars, the ends of the rear bars being forwardly directed, shackles pivotally connecting the ends of the rear bars to the ends of the front bars, one of the front bars with its connected members being positioned forward of the other bars with their connected members, and means for attaching the bumper to a car.

26. A bumper comprising a plurality of front bars and a plurality of rear bars, the ends of the rear bars being forwardly directed, shackles pivotally connecting the ends of the rear bars to the ends of the front bars, each of the front bars, with its connected members, being positioned in a different vertical plane with respect to the others.

27. A bumper comprising a plurality of front bars and a plurality of rear bars, the ends of the rear bars being forwardly directed, concussion-absorbing means located between the ends of the said bars, shackles pivotally connecting the ends of the rear bars to the ends of the front bars, each of the front bars with its connected members being positioned in a different vertical plane with respect to the others.

28. A bumper comprising a plurality of front bars and a plurality of rear bars, the ends of the rear bars being forwardly directed, shackles pivotally connecting the ends of the rear bars to the ends of the front bars, concussion-absorbing blocks enclosed by said shackles, each of the front bars, with its connected members, being positioned in a different vertical plane with respect to the others.

29. A bumper comprising a plurality of front bars and a plurality of rear bars disposed in the same horizontal plane, the extremities of the rear bars being forwardly directed and pivotally connected to the extremities of the front bars, each of the front bars, with its connected parts, being in a different vertical plane with respect to the others.

30. A bumper comprising a front bar and a rear bar, means for connecting together the ends of said bars, and a concussion-absorbing member held in place by said connecting means between the ends of said bars, substantially as described.

31. A bumper comprising a front bar and a rear bar, the ends of the rear bar being forwardly directed, means for connecting the ends of the two bars in spaced relation, and a concussion-absorbing member held in position between the ends of said bars by said connecting means, substantially as described.

32. A spring bumper comprising a front bumper bar, a rear bumper bar free from the front bar and of different length therefrom, and shackles connecting the ends of the bars.

In testimony whereof, I have signed my name to this specification.

ALEXANDER M. HUDSON.